US012467288B2

(12) United States Patent
Ilardo et al.

(10) Patent No.: US 12,467,288 B2
(45) Date of Patent: Nov. 11, 2025

(54) HANDLE ARRANGEMENT

(71) Applicant: U-shin Italia S.p.A, Pianezza (IT)

(72) Inventors: Simone Ilardo, Pianezza (IT); Alberto Tropini, Pianezza (IT); Gabriele D'Agostino, Pianezza (IT); Ivan Perkovic, Pianezza (IT)

(73) Assignee: U-shin Italia S.p.A, Pianezza (IT)

( * ) Notice: Subject to any disclaimer, the term of this patent is extended or adjusted under 35 U.S.C. 154(b) by 321 days.

(21) Appl. No.: 18/179,516

(22) Filed: Mar. 7, 2023

(65) Prior Publication Data

US 2023/0332441 A1 Oct. 19, 2023

(30) Foreign Application Priority Data

Apr. 13, 2022 (EP) .................................... 22168082

(51) Int. Cl.
*E05B 85/10* (2014.01)
*E05B 77/06* (2014.01)

(52) U.S. Cl.
CPC ............ *E05B 77/06* (2013.01); *E05B 85/103* (2013.01); *E05B 85/107* (2013.01)

(58) Field of Classification Search
CPC .... Y10S 292/22; Y10S 292/31; E05B 85/103; E05B 85/107; E05B 77/06
See application file for complete search history.

(56) References Cited

U.S. PATENT DOCUMENTS 9,151,090 B2 * 10/2015 Beck ....................... E05B 85/14
9,567,777 B1 * 2/2017 VandenBrink .......... E05B 77/02
10,087,661 B2 * 10/2018 Ilardo ..................... E05B 77/12
10,787,842 B2 * 9/2020 Savant .................... E05B 79/20
2021/0381284 A1 12/2021 Toyama
(Continued)

FOREIGN PATENT DOCUMENTS

DE 102009044042 A1 * 3/2011 ............. E05B 77/06
DE 102011115009 A1 * 4/2012 ............. E05B 77/06
(Continued)

OTHER PUBLICATIONS

Extended European Search Report issued on Oct. 20, 2022 in European Patent Application No. 22168082.0, 5 pages.

*Primary Examiner* — Carlos Lugo
(74) *Attorney, Agent, or Firm* — Oblon, McClelland, Maier & Neustadt, L.L.P.

(57) ABSTRACT

The invention relates to an handle arrangement comprising a handle, a latch lever for unlatching the door, a deploying system pivotally coupled with the handle, a blocking system comprising an inertial rotor configured to be driven in rotation by an inertial force from a rest position to a preventing position, wherein the blocking system further comprises a bridge moveable about a pivot axis between a disengaged position and an engaged position, wherein the bridge comprises an engagement arm that, in the disengaged position, is spaced apart from the latch lever and, in the engaged position, engages the latch lever to prevent the unlatching of the door, wherein the bridge further comprises an actuating arm configured to cooperate with the inertial rotor when the latter moves from the rest position to the preventing position, such cooperation moving the bridge from the disengaged position and the engaged position.

14 Claims, 9 Drawing Sheets

(56) References Cited

U.S. PATENT DOCUMENTS

| | | | |
|---|---|---|---|
| 2022/0194188 | A1 | 6/2022 | Toyama |
| 2022/0195762 | A1 | 6/2022 | Toyama |

FOREIGN PATENT DOCUMENTS

| | | | | | |
|---|---|---|---|---|---|
| DE | 102012101059 | A1 * | 8/2013 | ............. | E05B 77/06 |
| EP | 3396088 | A1 * | 10/2018 | ............. | E05B 77/06 |
| WO | WO-2012175599 | A1 * | 12/2012 | ............. | E05B 77/06 |
| WO | WO-2013152935 | A1 * | 10/2013 | ......... | E05B 17/0062 |
| WO | WO-2020020656 | A1 * | 1/2020 | ............. | E05B 77/06 |
| WO | WO 2021/049212 | A1 | 3/2021 | | |
| WO | WO 2021/049213 | A1 | 3/2021 | | |

* cited by examiner

HANDLE ARRANGEMENT

The invention relates to a handle arrangement of a motor vehicle, and particularly to a translational handle arrangement, in particular for a roll-up door, more particularly the invention relates to a flush translational handle arrangement.

Flush handles of motor vehicles are designed to fit with the surface of the door panel at the rest position, resulting in an improved aerodynamism and a better visual for the user.

Accordingly, flush handles require an action from the user, like a mechanical input on one end of the handle or an electronic signal, to move from a stowed position to a deployed position wherein the user will be able to grab and pull it to an operative position granting physical access to the vehicle.

Translational handles are arranged in roll-up doors. Said type of handles comprises a front lever and a rear lever cooperating with the two ends of the handle and which both rotate for moving the handle from the stowed position to the deployed position. When the user pulls the handle at the deployed position, the latter moves to the operative position causing the rear lever to drive in rotation a latch lever pulling a latch cable which unlocks the door latch.

However, during a crash accident of the motor vehicle, while the user does not provide any action to deploy the handle nor unlatch the door, the door can undesirably be unlatched because of the inertial force resulting from the displacement of the motor vehicle an applied to the handle arrangement mechanism, exposing the user to potential outside injuries.

It is known from the art to provide the translational handle arrangement with an inertial rotor which is driven in rotation during a crash accident to rotationally immobilize the rear lever, preventing, therefore, the actuation of the latch lever.

Nevertheless, the kinematic mechanism chain involved in this system is long, which can result in an undesired actuation of the latch lever. Moreover, the rear lever can undergo torsions during the crash accident resulting in its deformation and an undesired actuation of the latch lever.

One object of the invention is to provide a more effective system for impairing with undesired unlatching of the door.

To that end, the invention relates to a handle arrangement comprising

- a handle moveable between a stowed position, a deployed position and an operative position in which the handle causes the unlatch of a door,
- a latch lever for unlatching the door,
- a deploying system pivotally coupled with the handle and comprising a front lever and a rear lever each cooperating with an end of the handle, the rear lever comprising a driving member that, in the stowed and deployed positions of the handle, is spaced apart from the latch lever and, in the operative position of the handle, actuates the latch lever to unlatch the door,
- a blocking system comprising an inertial rotor configured to be driven in rotation by an inertial force from a rest position to a preventing position,
- wherein the blocking system further comprises a bridge moveable about a pivot axis between a disengaged position and an engaged position, wherein the bridge comprises an engagement arm that, in the disengaged position, is spaced apart from the latch lever and, in the engaged position, engages the latch lever to prevent the unlatching of the door, wherein the bridge further comprises an actuating arm configured to cooperate with the inertial rotor when the latter moves from the rest position to the preventing position, such cooperation moving the bridge from the disengaged position and the engaged position.

The blocking system of the handle arrangement of the invention is advantageously provided with a bridge that cooperates directly with the latch lever and can block faster a rotation of the latch lever such as preventing the unlatching of a door during a crash accident.

In one embodiment of the invention, the inertial rotor comprises a guide cooperating with the actuating arm of the bridge.

Notably, the guide of the inertial rotor is formed by a bent arm configured to push onto the actuating arm of the bridge when the inertial rotor moved from the rest position to the blocking position.

In another embodiment of the invention, the actuating arm of the bridge comprises a free end with a finger for cooperating with the wall of the guide of the inertial rotor.

In another embodiment of the invention, the inertial rotor comprises a blocking member configured to engage, in the blocking position, the rear lever and prevent its rotation.

In another embodiment of the invention, the inertial rotor is maintained in the rest position by a reversible deformable member.

In another embodiment of the invention, the bridge extends in parallel to the rear lever.

In another embodiment of the invention, the bridge is maintained in the disengaging position by a reversible deformable member.

In another embodiment of the invention, the bridge comprises an upper end facing the latch lever and a lower end facing the inertial rotor, the engagement arm extending from the upper end and the actuating arm extending from the lower end.

In another embodiment of the invention, the engaging and actuating arms of the bridge extend parallel.

In another embodiment of the invention, the bridge further comprises a counterweight disposed oppositely to the extension of actuating arm.

In another embodiment of the invention, the bridge comprises a hollow cylindrical core about which the bridge pivots and to which extends the engaging and actuating arms.

In another embodiment of the invention, the latch lever comprises a counter-engaging member arranged to cooperate with the engagement arm of the bridge in the engaged position.

Notably, the counter-engaging member is in form of an open mouth with two stoppers extending in different directions.

The invention will be better understood in view of the following description, referring to the annexed figures in which:

FIG. 3A is a lateral side view of the handle arrangement and FIG. 3B is a detailed view of FIG. 3A showing the cooperation from that side between a blocking system and a deploying system of the handle arrangement.

FIG. 4A is a lateral side view of the handle arrangement and FIG. 4B is a detailed view of FIG. 4A showing the cooperation from that side between a blocking system and a deploying system of the handle arrangement.

FIG. 5A is a lateral side view of the handle arrangement and FIG. 5B is a detailed view of FIG. 5A showing the cooperation from that side between a blocking system and a deploying system of the handle arrangement.

FIG. 6A is a lateral side view of the handle arrangement and FIG. 6B is a detailed view of FIG. 6A showing the cooperation from that side between a blocking system and a deploying system of the handle arrangement.

FIG. 7A is a lateral side view of the handle arrangement and FIG. 7B is a detailed view of FIG. 7A showing the cooperation from that side between a blocking system and a deploying system of the handle arrangement.

FIG. 8A is a lateral side view of the handle arrangement and FIG. 8B is a detailed view of FIG. 8A showing the cooperation from that side between a blocking system and a deploying system of the handle arrangement.

DETAILED DESCRIPTION OF THE INVENTION

Figure 1:
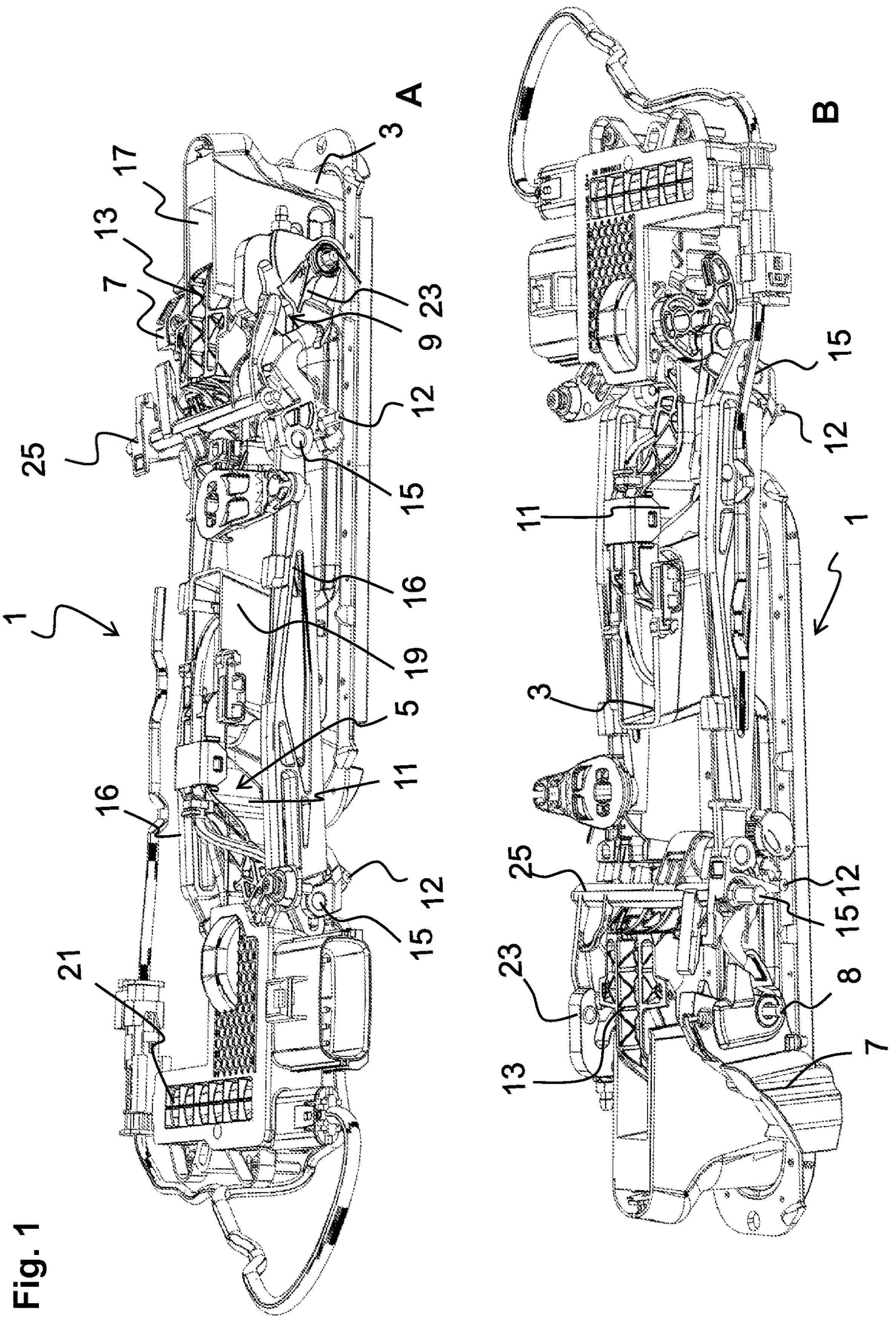
FIG. 1 represents two perspective views (A and B) from opposite lateral sides of a handle arrangement according to the invention.

The following achievements are examples. Although the specification refers to one or several embodiments, it does not imply that each reference refers to the same embodiment or that the features apply only to a single embodiment. Simple features of different embodiments can also be combined to provide other embodiments. Front, rear, left, right, longitudinal, up, down, interior and exterior are considered relating to the motor vehicle orientations in which the handle arrangement of the invention is intended to be implemented.

The invention relates to a handle arrangement 1 of a motor vehicle, and more particularly to a translational handle arrangement 1. The handle arrangement 1 comprises a bracket (not represented) in which are implemented a handle 3, a deploying system 5 of the handle 3, a latch lever 7 for unlatching a door (not represented) and a blocking system 9 for preventing an undesired activation of the latch lever 7.

Handle 3 is moveable between a stowed position (FIGS. 1 and 3), a deployed position (FIGS. 5 and 6) and an operative position (FIG. 9) in which handle 3 causes the unlatching of the door via the latch lever 7. More specifically, the operative position of handle 3 triggers the rotation of the latch lever 7 about an axle 8, causing the unlatching of the door.

As represented in FIGS. 1A and 1B, the deploying system 5 of the handle 3 comprises two levers, namely a front lever 11 and a rear lever 13, each one being rotatable about a respective double axles mechanism. Said double axles mechanisms each comprises a stationary axle 12 about which pivots a movable spindle 15. The stationary axles 12 and movable spindles 15 extend parallel to the axles 8. The rear lever 13 cooperates with the rear end 17 of the handle 3 and the front lever 11 cooperates with the front end 19 of the handle 3. The movement of the rear and front levers (11, 13) may be coordinated by two cross-members 16, each coupled to the movable spindle 15 of both levers (11, 13). The deploying system may further comprise a driving system 21 coupled to the front lever 11, as represented in FIG. 1.

A mechanical or electrical input provided by a user triggers a first tipping of the front and rear levers (11, 13) around the stationary axles 12, moving the handle 3 from the flush position to the deployed position. In the case of electrical input, the first tipping may be operated by the driving system 21. Handle 3 is then in a position to be grabbed and pulled by the user to unlatch the door, granting physical access to the vehicle. Pulling the handle 3 initiates a second tipping of the front and rear levers (11, 13), moving handle 3 from the deployed position to the operative position. The second tipping of the rear lever 13 puts it into contact with the latch lever 7 and rotationally drives the latter for unlatching the door.

The blocking system 9 role is then to impair undesired actuation caused by inertial forces of the latch lever directly and optionally also via the rear lever 13.

Figure 2:
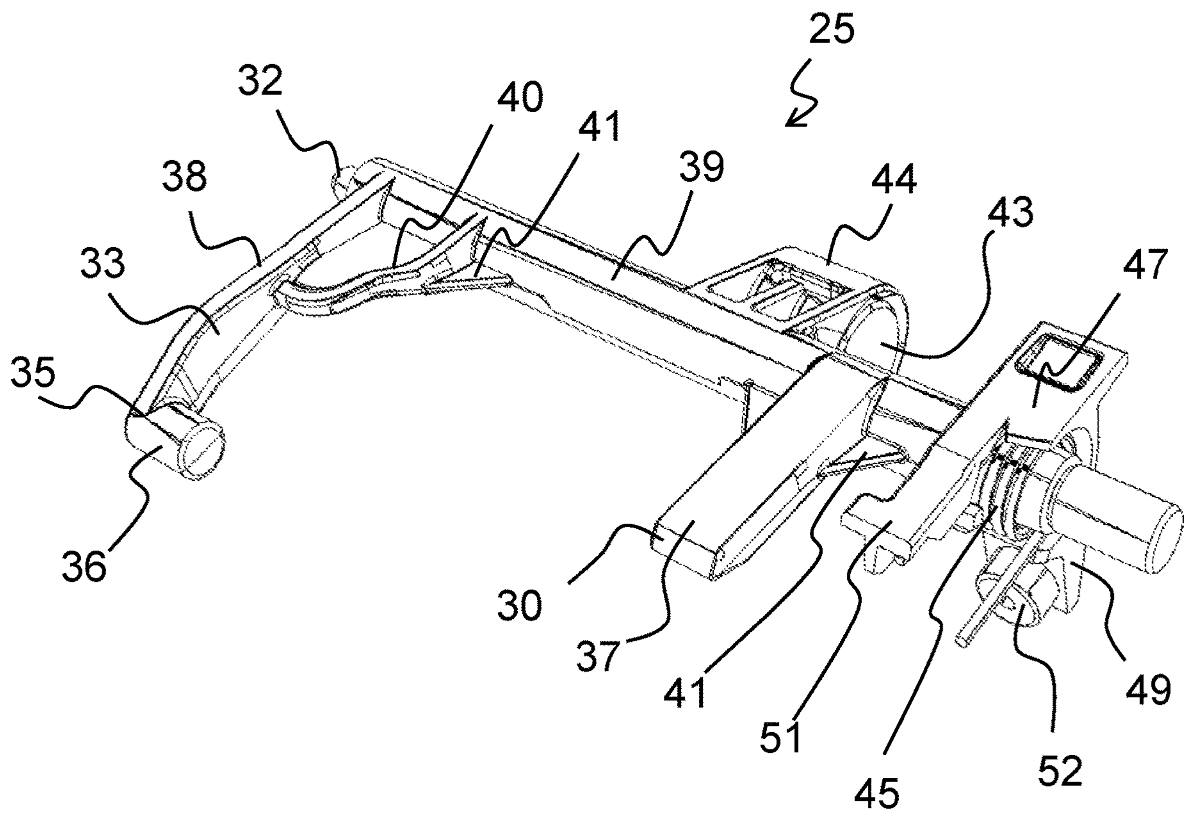
FIG. 2 is a detailed view of the handle arrangement of FIG. 1 representing a perspective view of a bridge of a blocking system according to the invention.

To that end, as shown in FIG. 1 the blocking system 9 comprises an inertial rotor 23 and a bridge 25 (shown in detail in FIG. 2).

Figure 3:
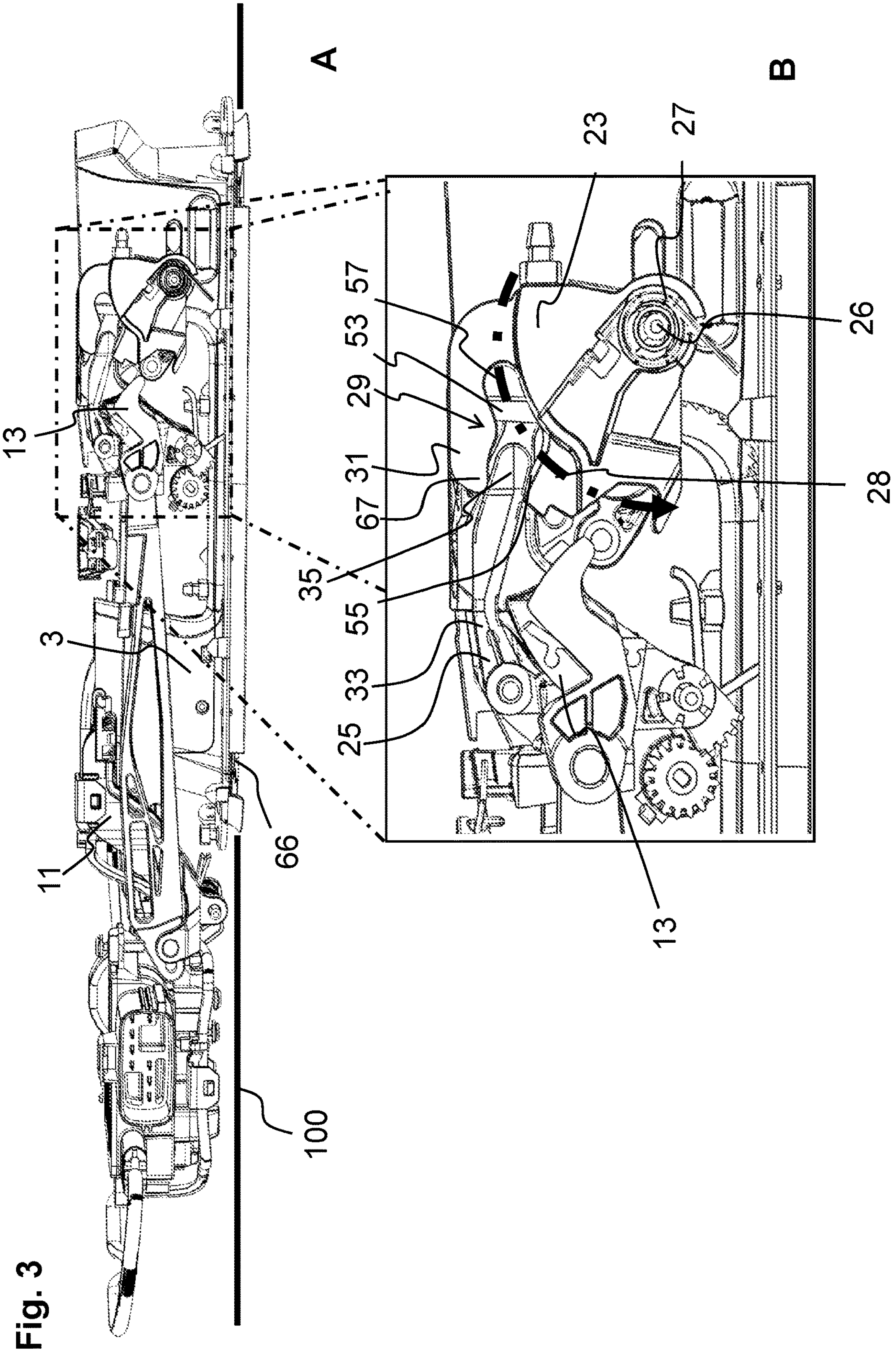
FIG. 3 represents two views (A and B) of the handle arrangement of FIG. 1 with a handle in a stowed position.
Figure 6:
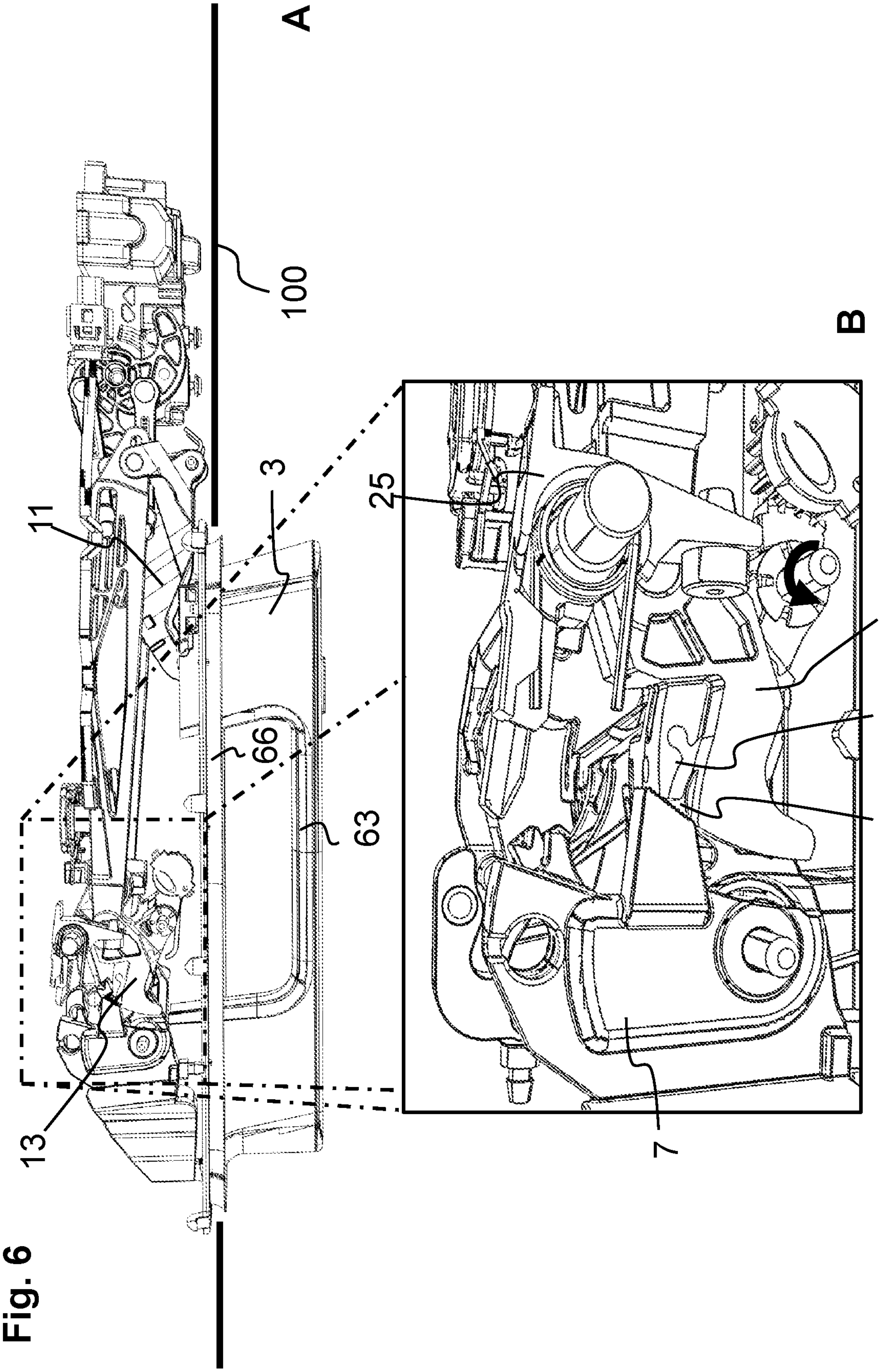
FIG. 6 represents two views (A and B) of the handle arrangement of FIG. 1 with a handle in a deployed position, viewed from the opposite lateral side represented in FIG. 5.

The inertial rotor 23 is configured to be driven in rotation about an axle 26 by inertial forces from a rest position (FIG. 3) to a preventing position (FIG. 6). Such inertial forces may result from a lateral crash accident of the vehicle. Turning to FIG. 3, inertial rotor 23 will be described hereafter in detail. The axle 26 of the inertial rotor 23 extends parallel to the axle of the latch lever 7. The inertial rotor 23 is maintained in the rest position by the action of a reversible deformable member 27. The reversible deformable 27 member may be a spring, like a helicoidal spring. In the rest position, the reversible deformable 27 pushes the inertial rotor 23 against the bracket, notably a resilient bearing fixed to the bracket. The inertial rotor 23 may comprise a blocking member 28 arranged to prevent the tipping of the rear lever 13 in the preventing position. This aspect of the invention represents a secondary blocking means for impairing undesired actuation of the latch lever 7, described in more detail below. When moving from the rest position to the preventing position, the inertial rotor 23 drives into motion the bridge 25 by means of a driving member 29. The driving member 29 may comprise a guide 31 formed by a curved arm. The blocking member 28 may be the same member as the driving member 29 or may be part of the driving member 29, as described in detail below.

Turning now to FIG. 2, bridge 25 will be described in detail. Bridge 25 is moveable about a pivot axis 32 between a disengaged position and an engaged position in which it directly blocks the actuation of the latch lever 7. This aspect of the invention represents the main blocking means for impairing undesired actuation of the latch lever 7. Bridge 25 does not cooperate with the rear lever 13 and directly cooperates with the latch lever 7. Hence, bridge 25 is independent of the rotational stroke of the rear lever 13 and can act faster than the secondary blocking means against the undesired actuation of the latch lever 7. This reduces the undesired rotational course of the latch lever 7 and improves the prevention of an undesired unlatching of the door.

Bridge 25 is implemented in the bracket of the handle arrangement 1 by the two free ends of axle 32. The said axle 32 may extend parallel to the rear lever 13, and more specifically parallel to the axles 12, 15 of the rear lever 13.

As represented in FIG. 2, bridge 25 comprises an actuating arm 33 arranged for cooperating with the inertial rotor 23 when the latter moves from the rest position to the preventing position. More specifically, as shown in FIG. 3B, the actuating arm 33 comprises a free end 35 for cooperating with the driving member 29 of the inertial rotor 23. The said free end 35 may be provided with a finger 36 extending perpendicularly to the arm 33 and cooperating with guide space 31 of the inertial rotor 23. Cooperation between the inertial rotor 23 and the actuating arm 33 may be seen as pushing on a pedal (here the actuating arm 33), causing the bridge 25 to tilt from the disengaging position to the engaging position.

The actuating arm 33 may comprise two arms extending parallel and joined by their free end, notably by the finger 36. Alternatively, as represented, the actuating arm 17 may be formed by a main arm 38 and a reinforcing arm 40 ending into the body of the main arm 25.

Bridge 25 also comprises an engagement arm 37 arranged for cooperating with the latch lever 7. In the disengaging position of bridge 25, the engagement arm is spaced apart from the latch lever 7, letting the latter freely rotate and unlatch the door. Whereas, in the engaging position, the engagement arm 37 comes into contact with the latch lever 7, blocking the rotation of the latter and preventing an undesired unlatching of the door. As represented in FIG. 2, the engagement arm 37 may be a finger, like a straight rigid finger. The free end 30 of the engagement arm 37 may be beak-shaped for better cooperation with the latch lever 7, as described in detail below.

The engagement arm 37 and the actuating arm 33 may extend in the same direction, as represented. The actuating arm 33 may extend from an upper end of bridge 25, while the engagement arm 37 may extend from a lower side of bridge 25.

Bridge 25 may further comprise a hollow cylindrical core 39 wound around the axle 32 and to which extends the engaging and actuating arms (37, 33). The fixation of the engaging and actuating arms (37, 33) to the hollow cylindrical core 39 may be strengthened by one more supports 41, especially of a fin-shape.

The bridge may also comprise a counterweight 43 disposed oppositely to the extension of the actuating arms 33, for counterbalancing the load force exerted by the inertial rotor 23 on the actuating arm 33, when moving from the resting to the preventing position. The counterweight 43 may be disposed between the actuating arm 33 and the engagement arm 37 along the axle 32, and more specifically, along with the cylindrical core 39. The counterweight 43 may be disposed in a housing 44 extending oppositely to the actuating arm 33 direction. Hence the counterweight 43 and the actuating arm 33 extend on either side of the longitudinal direction of the hollow cylindrical core 31.

Bridge 25 may be maintained in the disengaging position by a reversible deformable member 45. The reversible deformable member 45 may be disposed in a cover 47 notably arranged at the lower end of bridge 25. Hence the engagement arm 37 may be disposed in between the actuating arm 33 and the cover 47, as represented in FIG. 2. Cover 47 may be L-shaped with two arms extending perpendicularly, namely a holding arm 49, notably extending in direction of the bracket, and a supporting arm 51, notably extending in direction of the push lever 7. The reversible deformable member 45 may be arranged to maintain the holding arm 49 of the housing 41 against a part of the bracket in the disengaged position, notably via a resilient bearing 52. The reversible deformable member 45 may bear against the supporting arm 51. As also represented in FIG. 2 the reversible deformable member 45 may be a spring, and more particularly a helicoidal spring wound around the hollow cylindrical core 39 with one end bearing against the supporting arm 51.

The deploying and blocking mechanisms cinematic will now be described in view of FIGS. 3 to 9 representing a handle arrangement 1 of the invention with a handle 3, a deploying system 5 of the handle 3, a latch lever 7 and a blocking system 9 in the different positions. In those figures, the bracket of handle arrangement 1 has been represented for better viewing of the other elements.

Figure 4:
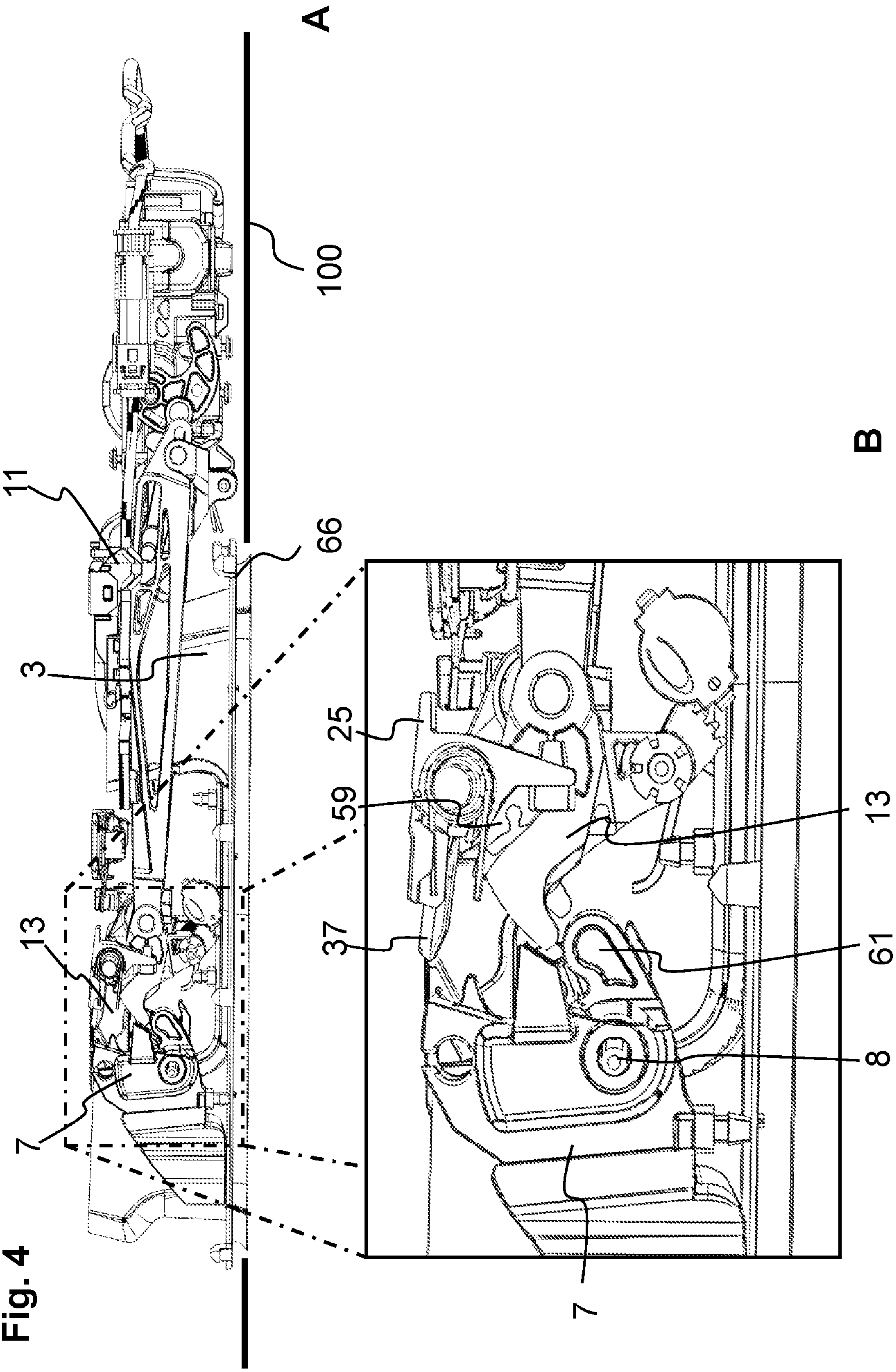
FIG. 4 represents two views (A and B) of the handle arrangement of FIG. 1 with a handle in a stowed position, viewed from the opposite lateral side represented in FIG. 3.

FIGS. 3 and 4 represent from two opposite lateral sides handle arrangement 1 wherein handle 3 is in the stowed position. In that position, handle 3 is arranged to be flush with a door panel 100 and a handle frame 66 (see FIGS. 3A and 4A) and cannot be grabbed by a user. The front lever 11, the rear lever 13, the bridge 25, the inertial rotor 23 and the latch lever 7 are all in a rest position.

FIG. 3B shows in detail the cooperation, in that position, between the rear lever 13, the actuating arm 33 of the bridge 25 and the driving member 29 of the inertial rotor 23. Here, the rear lever 13 and the inertial rotor 23 are spaced apart. In the represented embodiment, the driving member 29 comprises a curved arm 31 defining a guide space 53 for guiding the actuating arm 33 movement. The guide space 53 may have two portions, namely an entrance portion 55 and a deep portion 57, extending in different directions. The direction of the entrance portion 55 is configured to rapidly rotatably drive bridge 25 in the engaging position when the inertial rotor 23 undergoes an inertial force and moves from the rest position to the preventing position. To that end, the direction of the entrance portion 55 crosses the circular direction of the inertial rotor 23 movement (represented by a hash-dotted line). The direction of the deep portion 57 is configured to maintain bridge 25 in the engaged position, while the inertial rotor 23 keep tilting to the preventing position. To that end, the direction of the deep portion 57 follows the circular direction of the inertial rotor 23 movement. As represented, at the disengaged position of the bridge 25, the free end 35, and more particularly the finger 36, of the actuating arm 33 may be disposed in the entrance portion 55 of the guide space 53. This allows better responsiveness of the blocking system 9. In case the inertial rotor 23 comprises a blocking member 28, the latter, in that position, is spaced apart from the rear lever 13.

FIG. 4B shows in detail the cooperation between the rear lever 13, the latch lever 7 and the engagement arm 37 of the bridge 25. Here, all these elements are spaced apart. As represented here, the rear lever 13 may comprise a first driving member 59 for rotationally driving the latch lever 7 by pushing against a push member 61 of the latter. The first driving member 59 and the push member 61 are, in that position, also spaced apart.

Figure 5:
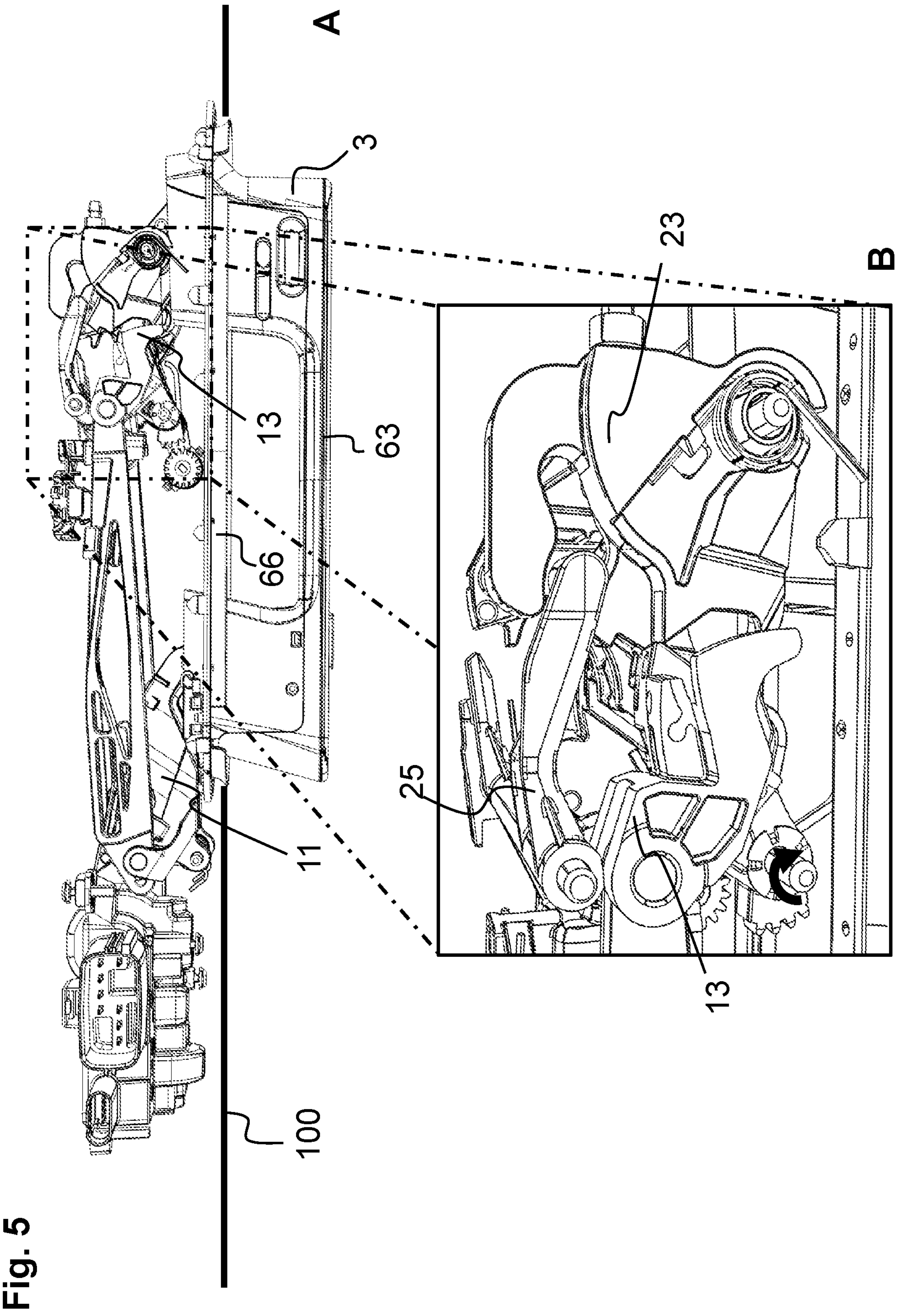
FIG. 5 represents two views (A and B) of the handle arrangement of FIG. 1 with a handle in a deployed position.

FIGS. 5 and 6 represent from two opposite lateral sides handle arrangement 1 wherein handle 3 is in the deployed position. The handle 3 has been arrived in that position by a first tipping of the front and rear levers (11, 13) triggered by the user, optionally driven by the driving system 21. The handle 3 extends here out of the door panel 100 and the handle frame 66 causing a grabbing part 63 of handle 3 to be made accessible to the user. This enables the user to grab and move handle 3 to the operative position (see FIGS. 5A and 6A).

FIG. 5B shows in detail the cooperation, in that position, between the rear lever 13, the actuating arm 33 of the bridge 25 and the driving member 29 of the inertial rotor 23. Since the deployment of the handle has been activated by the user, the blocking system 9 was not triggered. Hence, the inertial rotor 23 and the bridge are in the same position as the one shown in FIG. 2. Meanwhile, the rear lever 13 has tipped to an intermediate position. As showed here, the inertial rotor is sized to not impair, in the rest position, with the tipping of the rear lever 13.

FIG. 6B shows, in that position, the cooperation between the rear lever 13, the latch lever 7 and the engagement arm 37 of the bridge 25. Since bridge 25 and the latch lever 7 have not been activated, they stay in the same position as the one represented in FIG. 2. Meanwhile, because of the first tilting, the first driving member 59 of the rear lever 13 has been putting into contact with the push member 61 of the latch lever 7, ready to rotatably drive the latch lever 7.

Figure 7:
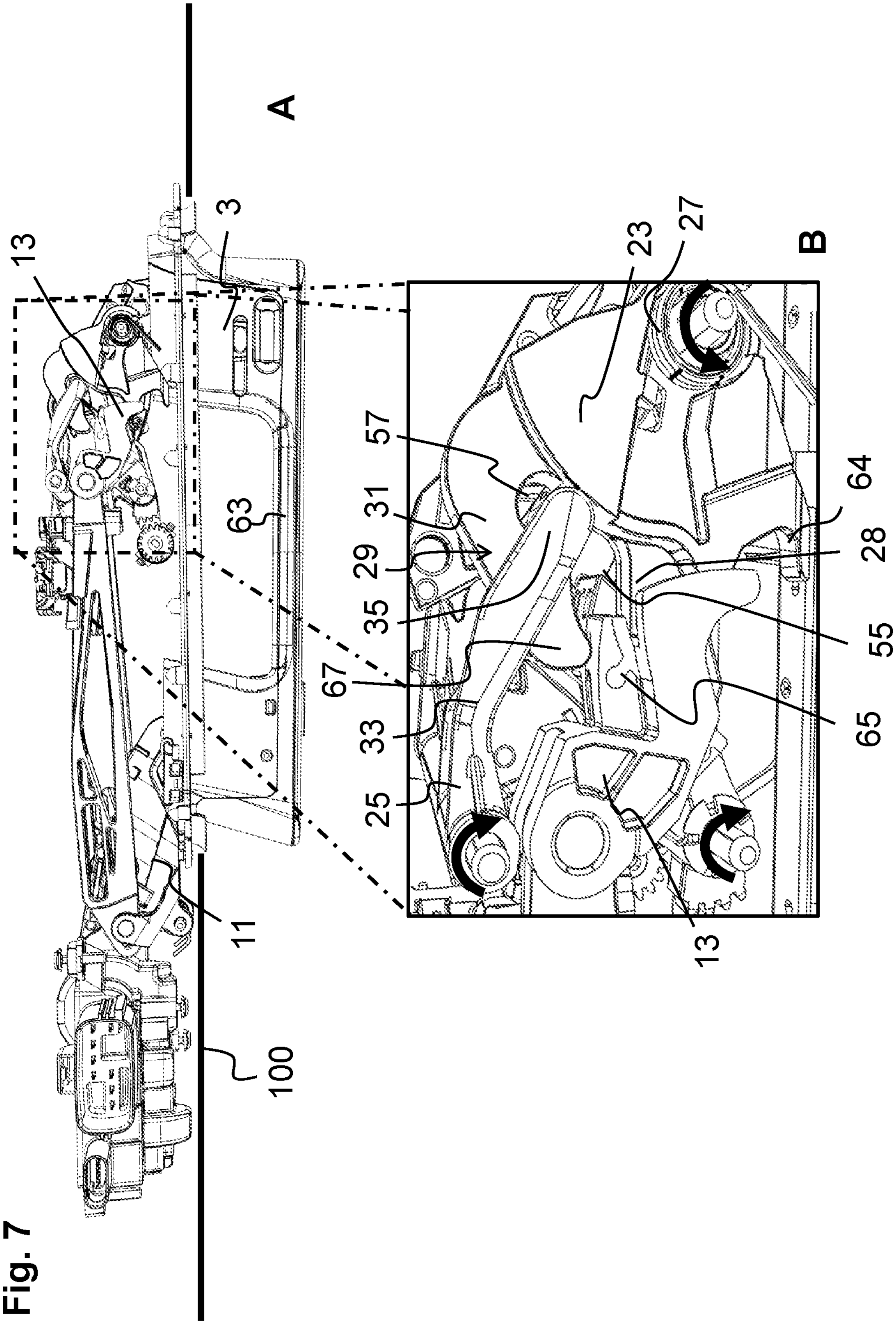
FIG. 7 represents two views (A and B) of the handle arrangement of FIG. 1 undergoing inertial forces.
Figure 8:
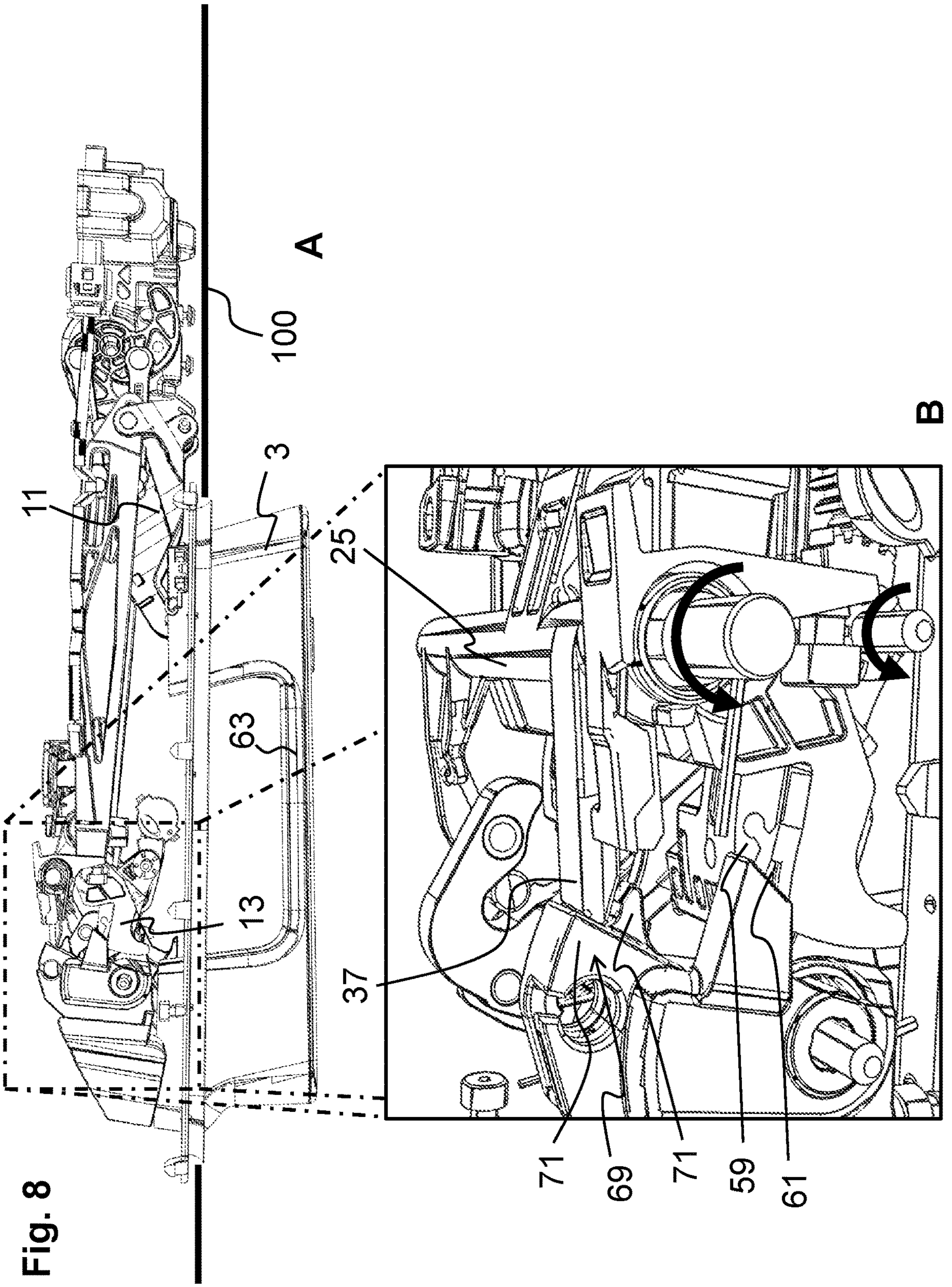
FIG. 8 represents two views (A and B) of the handle arrangement of FIG. 1 undergoing inertial forces, viewed from the opposite lateral side represented in FIG. 7.

FIGS. 7 and 8 represent the situation when handle arrangement 1 undergoes inertial force which triggers the blocking system. As represented in FIGS. 7A and 8A, the front and the rear lever 11, 13 performed by their own the first tilting, driven by their weight. Consequently, handle 3 moved from the stowed position to a deployed-like position in which it extends out of the door panel 100 and where grabbing part 63 is made accessible. In that situation, although grabbing part 63 is made accessible, actuating the rear lever 13 will not actuate the latch lever 7 as described in detail below.

FIG. 7B shows in detail the cooperation, in that situation, between the rear lever 13, the actuating arm 33 of the bridge 25 and the driving member 29 of the inertial rotor 23. The inertial rotor 23 is here in the preventing position, which may be defined as the contact between a supporting member 64 of the inertial rotor 23 and the bracket (not represented). When moving from the rest position to the preventing position, the inertial rotor 23 pushed on the free end 35 of the actuating arm 33, causing the latter to move deeper through the guide space 31 to the deep portion 57. Hence bridge 25 tilted from the disengaged position to the engaged position. In the represented embodiment, the inertial rotor 23 comprises a blocking member 28 for blocking the movement of the rear lever 13. Notably, the blocking member 28 cooperates with a finger 65 of the rear lever 13. Here, the blocking member 28 is an extension part of the driving member 29 and define, together with the free end 67 of the curved arm 31, the entrance portion 55 of the guide space 31 (see also FIG. 3B). Hence, while finger 65 of the rear lever 13 get into the entrance portion 55 and pushes on the blocking member 28, driven by the inertial force, the free end 67 of the curved arm 31 comes into contact with the finger 65. This leads the blocking member 28 and the curved arm 31 to catch like a pincer the finger 65 and block the rotation of the rear lever 13. This prevents the rear lever 13 to push against the latch lever 7. Hence, in that position, the actuating arm 33 cooperates with the deep portion 57 of the space guide 31, while the finger 65 cooperates with the entrance portion 55 of the space guide 31.

FIG. 8B shows in detail the cooperation, in that situation, between the rear lever 13, the latch lever 7 and the engagement arm 37 of the bridge 25. Because actuation arm 33 tilted, the engagement arm 37 comes into contact with the latch lever 7. Notably, the engagement arm 37 engages a counter-engaging part 69 of the latch lever 7. The said counter-engaging part 69 can be in form of an open mouth with two stoppers 71 extending in different directions. Each stopper 17 is provided with a flat surface in contact, in that position, with the engagement arm 37. This specific form of the counter-engaging part 69 first allows better cooperation between the engagement arm 37 and the counter-engaging part 69 and secondly decreases, even prevents, failing cooperation between these elements in case of torsions undergone by the bridge 25 during a crash accident. Meanwhile, because of the first tipping, the first driving member 59 of the rear lever 13 is facing, even in contact with, the push member 61 of the latch lever 7. However, although the first driving member 59 may push on push member 61, e.g., in case the inertial rotor 23 does not comprise a blocking member 28, this action would not lead to the tilting of the latch lever 7 which is blocked by the contact between the engagement arm 37 and the counter-engaging part 69.

When the inertial forces stop to affect the handle arrangement 1, the inertial rotor 23, the bridge 25, the front and rear lever (11, 13) passively return to their respective rest position by the action of respective reversible deformable members. The back movement of the inertial rotor 23 follows the reverse tipping of the rear lever 13 and helps fold down the handle 3 to the stowed position by contact between the blocking member 28 and the finger 65 follows the reverse tipping of the rear lever 13. Meanwhile, the actuating arm 33 moves back to the entrance portion 55 of the guide space 31, leading bridge 25 to return to the disengaged position.

Figure 9:
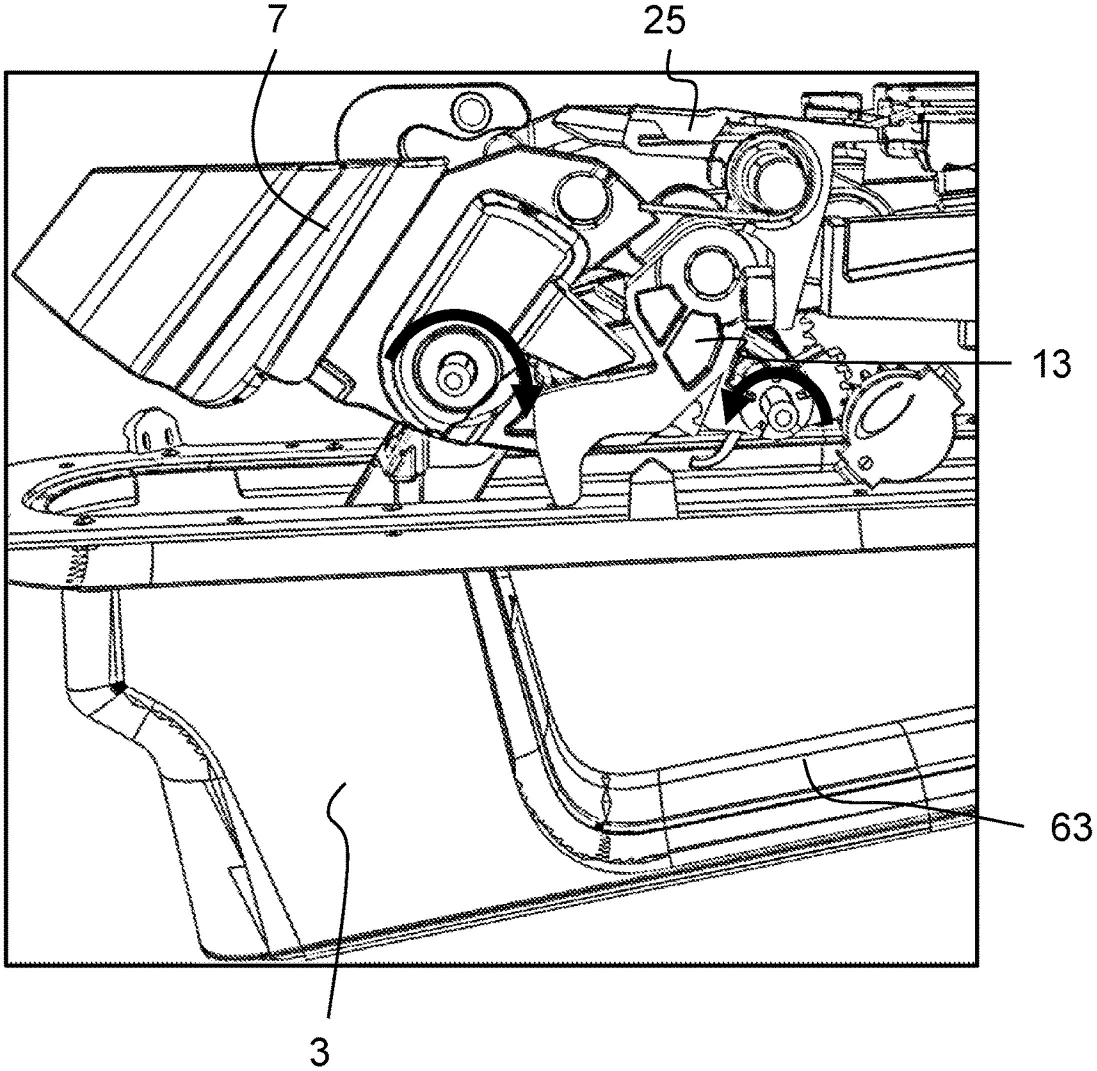
FIG. 9 is a detailed lateral view of the handle arrangement of FIG. 1 with a handle in an operative position.

FIG. 9 shows, in the operative position of the handle 3, the cooperation between the rear lever 13, the latch lever 7 and the engagement arm 37 of the bridge 25. This position of handle 3 is triggered by a pull on the grabbing part 63 by the user. This causes the first driving member 59 of the rear lever 13 to push on the push member 61 of the latch lever 7 and unlatch the door. The engagement arm 37 of bridge 23 is sized to not impair, in the disengaged position, with the latch lever 7 rotation.

The invention claimed is:

1. A handle arrangement comprising:

a handle moveable between a stowed position, a deployed position and an operative position in which the handle causes the unlatch of a door;

a latch lever for unlatching the door;

a deploying system pivotally coupled with the handle and comprising a front lever and a rear lever each cooperating with an end of the handle, the rear lever comprising a first driving member that, in the stowed and deployed positions of the handle, is spaced apart from the latch lever and, in the operative position of the handle, actuates the latch lever to unlatch the door; and a blocking system comprising an inertial rotor configured to be driven in rotation by an inertial force from a rest position to a preventing position, wherein the blocking system further comprises a bridge moveable about a pivot axis between a disengaged position and an engaged position, wherein the bridge comprises an engagement arm that, in the disengaged position, is spaced apart from the latch lever and, in the engaged position, engages the latch lever to prevent the unlatching of the door, and wherein the bridge further comprises an actuating arm configured to cooperate with the inertial rotor when the latter moves from the rest position to the preventing position, such cooperation moving the bridge from the disengaged position and the engaged position.

2. The handle arrangement according to claim 1, wherein the inertial rotor comprises a second driving member cooperating with the actuating arm of the bridge.

3. The handle arrangement according to claim 2, wherein the second driving member of the inertial rotor is formed by a curved arm configured to push onto the actuating arm of the bridge when the inertial rotor moves from the rest position to the blocking position.

4. The handle arrangement according to claim 2, wherein the actuating arm of the bridge comprises a free end with a finger for cooperating with the second driving member of the inertial rotor.

5. The handle arrangement according to claim 1, wherein the inertial rotor comprises a blocking member configured to engage, in the preventing position, the rear lever and preventing its rotation.

6. The handle arrangement according to claim 1, wherein the inertial rotor is maintained in the rest position by a reversible deformable member.

7. The handle arrangement according to claim 1, wherein the pivot axis of the bridge extends in parallel to a double axle mechanism of the rear lever.

8. The handle arrangement according to claim 1, wherein the bridge is maintained in the disengaging position by a reversible deformable member.

9. The handle arrangement according to claim 1, wherein bridge comprises a lower end facing the latch lever and an upper end facing the inertial rotor, the actuating arm extending from the upper end and the engagement arm extending from the lower end.

10. The handle arrangement according to claim 1, wherein the engaging and actuating arms of the bridge extend parallel.

11. The handle arrangement according to claim 1, wherein the bridge further comprises a counterweight disposed oppositely to the extension of actuating arm.

12. The handle arrangement according to claim 1, wherein the bridge comprises a hollow cylindrical core about which the bridge pivot and to which extends the engaging and actuating arms.

13. The handle arrangement according to claim 1, wherein the latch lever comprises a counter-engaging member arranged to cooperate with the engagement arm of the bridge in the engaged position.

14. The handle arrangement according to claim 13, wherein the counter-engaging member is in form of an open mouth with two stoppers extending in different directions.

* * * * *